United States Patent
Wengelnik et al.

(10) Patent No.: US 11,392,268 B2
(45) Date of Patent: Jul. 19, 2022

(54) USER INTERFACE FOR ACCESSING A SET OF FUNCTIONS, PROCEDURES, AND COMPUTER READABLE STORAGE MEDIUM FOR PROVIDING A USER INTERFACE FOR ACCESS TO A SET OF FUNCTIONS

(71) Applicant: VOLKSWAGEN AG, Wolfsburg (DE)

(72) Inventors: Heino Wengelnik, Wolfsburg (DE); Maria Esther Mejia Gonzalez, Redwood City, CA (US)

(73) Assignee: Volkswagen AG

( * ) Notice: Subject to any disclaimer, the term of this patent is extended or adjusted under 35 U.S.C. 154(b) by 0 days.

(21) Appl. No.: 15/704,638

(22) Filed: Sep. 14, 2017

(65) Prior Publication Data
US 2018/0081507 A1 Mar. 22, 2018

(30) Foreign Application Priority Data
Sep. 20, 2016 (DE) ...................... 10 2016 218 011.8

(51) Int. Cl.
*G06F 3/0482* (2013.01)
*G06F 16/248* (2019.01)
*G06F 16/904* (2019.01)
*B60K 37/02* (2006.01)
*G06F 40/263* (2020.01)

(52) U.S. Cl.
CPC ............ *G06F 3/0482* (2013.01); *B60K 37/02* (2013.01); *G06F 16/248* (2019.01); *G06F 16/904* (2019.01); *B60K 2370/11* (2019.05); *B60K 2370/152* (2019.05); *G06F 40/263* (2020.01)

(58) Field of Classification Search
CPC ...... G06F 3/0482; G06F 17/275; B60K 37/02
See application file for complete search history.

(56) References Cited

U.S. PATENT DOCUMENTS

| | | | |
|---|---|---|---|
| 2006/0282790 A1* | 12/2006 | Matthews | G06F 3/0482 715/767 |
| 2007/0073719 A1* | 3/2007 | Ramer | G06F 3/0346 |
| 2007/0162422 A1 | 7/2007 | Djabarov | |

(Continued)

FOREIGN PATENT DOCUMENTS

| | | |
|---|---|---|
| DE | 10304191 A1 | 8/2004 |
| DE | 102008051756 A1 | 5/2009 |

(Continued)

OTHER PUBLICATIONS

Burda, "Windows 10 Start Menu and Search bar", Published: Jun. 2, 2015, Youtube: Leszek Burda, https://www.youtube.com/watch?v=-BKIphxsk20 (Year: 2015).*

(Continued)

*Primary Examiner* — Seth A Silverman
(74) *Attorney, Agent, or Firm* — Barnes & Thornburg, LLP

(57) ABSTRACT

A user interface for accessing a number of functions, a method and a computer-readable storage medium including instructions for providing a user interface for accessing a number of functions. Assigned to a first subset of the functions are menu commands of the user interface, by way of which the functions are called up. No menu commands of the user interface are assigned to a second subset of the functions. Instead, the functions are called up by way of a search function of the user interface.

22 Claims, 5 Drawing Sheets

(56) References Cited

U.S. PATENT DOCUMENTS

| | | | |
|---|---|---|---|
| 2010/0205558 A1* | 8/2010 | Ng | G06F 3/0482 715/780 |
| 2014/0096081 A1* | 4/2014 | Carpenter | G06F 17/3064 715/825 |
| 2014/0237425 A1* | 8/2014 | Chan | G06F 3/0482 715/810 |

FOREIGN PATENT DOCUMENTS

| | | |
|---|---|---|
| DE | 102008051757 A1 | 5/2009 |
| DE | 102009024656 A1 | 3/2011 |
| DE | 102010011885 A1 | 9/2011 |
| DE | 102010045974 A1 | 3/2012 |
| DE | 102011112443 A1 | 3/2013 |
| DE | 102011116120 A1 | 4/2013 |
| DE | 102013223972 A1 | 5/2015 |
| DE | 102014004177 A1 | 9/2015 |
| DE | 102015103403 A1 | 9/2015 |
| DE | 102015208253 A1 | 11/2015 |
| EP | 1442920 A2 | 8/2004 |
| EP | 1655847 A2 | 5/2006 |
| JP | 2004078888 A | 3/2004 |
| JP | 2006193044 A | 7/2006 |
| JP | 2007317223 A | 12/2007 |
| JP | 2009237750 A | 10/2009 |
| JP | 2010003025 A | 1/2010 |
| KR | 20070114772 A | 12/2007 |
| KR | 20080091183 A | 10/2008 |
| KR | 20120041601 A | 5/2012 |
| KR | 20150013290 A | 2/2015 |
| WO | 2006101507 A2 | 9/2006 |
| WO | 2007079388 A1 | 7/2007 |
| WO | 2011045750 A1 | 4/2011 |
| WO | 2016042725 A1 | 3/2016 |

OTHER PUBLICATIONS

Ablassmeier; Multimodal, Context-Adaptive Information Management in the Automobile; Institute for Human-Machine Communication; Technical University Munich; Feb. 24, 2009; pp. 61-64 and 78-83.

Search Report for European Patent Application No. 17186361.6; dated Jan. 16, 2018.

Office Action for Korean Patent Application No. 10-2017-0120504; dated Nov. 28, 2018.

Search Report for German Patent Application No. 10 2016 218 011.8; dated May 11, 2017.

Gold; Unified Communications in the Car; Jan. 8, 2009; downloaded from http://web/archive.org/web/20100727135327/https://www.terrygold.com/t/2009-01/unified-communi.html.

Wikipedia; Start Menu; Sep. 3, 2016; downloaded from https://en.wikipedia.org/w/index.php?title=Start_menu&oldid=737500754.

Office Action for Korean Patent Application No. 10-2020-0049597; dated Jun. 19, 2020.

* cited by examiner

USER INTERFACE FOR ACCESSING A SET OF FUNCTIONS, PROCEDURES, AND COMPUTER READABLE STORAGE MEDIUM FOR PROVIDING A USER INTERFACE FOR ACCESS TO A SET OF FUNCTIONS

PRIORITY CLAIM

This patent application claims priority to German Patent Application No. 10 2016 218 011.8, filed 20 Sep. 2016, the disclosure of which is incorporated herein by reference in its entirety.

SUMMARY

Illustrative embodiments relate to a user interface for accessing a number of functions, and to a method and a computer-readable storage medium including instructions for providing a user interface for accessing a number of functions. Illustrative embodiments also relate to a driver information system and to a vehicle having such a user interface.

BRIEF DESCRIPTION OF THE DRAWINGS

Further features of the disclosed embodiments are apparent from the following description and the attached claims in conjunction with the figures.

DETAILED DESCRIPTION

Figure 1:
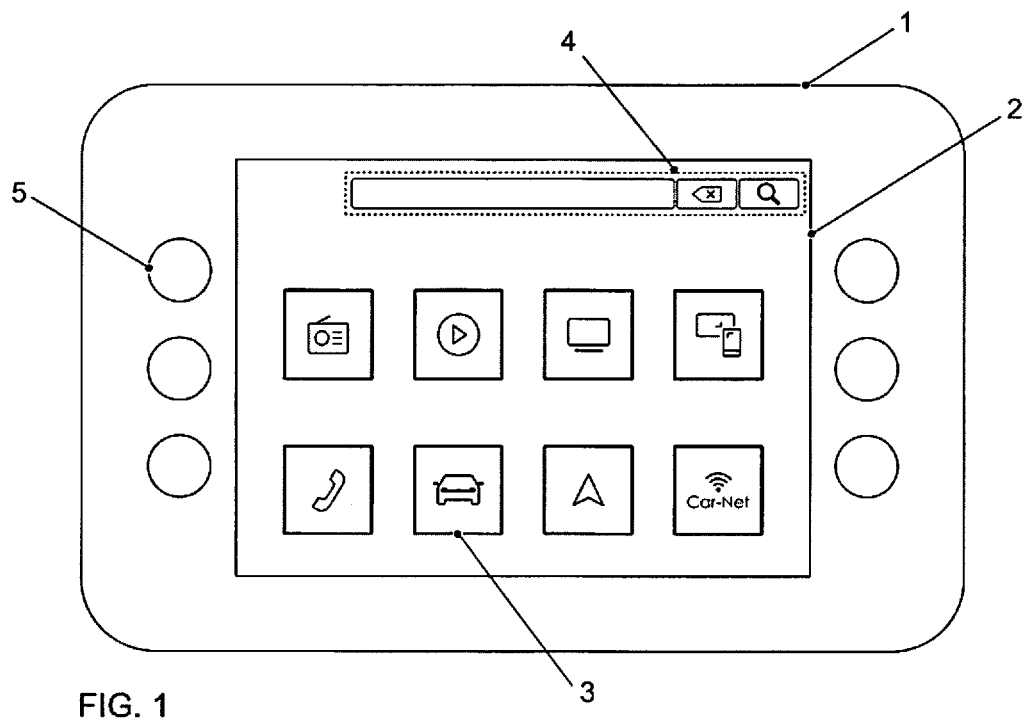
FIG. 1 schematically shows a user interface for accessing a number of functions.

Today's PC or CE devices, such as, for example, televisions, tablets, cell phones, etc., as well as driver information systems of vehicles, offer the user access to a large number of functions. For this purpose, the devices typically provide an HMI (HMI: human-machine interface), i.e., an interface, with the aid of which a user of the device can call up a desired function. Menu structures in which menu commands are assigned to the individual functions are usually utilized for this purpose. Due to the continuously increasing number of available functions, however, the menu structures are becoming increasingly confusing, which can be frustrating for the user. In addition, the user cannot devote his full attention to the system, especially when operating driver information systems, and instead must devote his full attention to driving the vehicle. A distraction resulting from the operation of the driver information system should be largely avoided.

A driver information system is essentially an on-board computer for a vehicle, in which specific functions are implemented for use in the vehicle as software applications. By a display device, for example, a display integrated into an instrument cluster or a separate screen mounted in the central console or on the instrument panel, information regarding the vehicle, the vehicle surroundings, or the trip, inter alia, is conveyed to the driver or a passenger. In addition, by way of the driver information system, traffic information can be queried and displayed, and vehicle-specific functions can be called up, for example, for the vehicle navigation or for changing vehicle settings. In addition, driver information systems are typically also used for infotainment, for example, for the playback of multimedia content, telecommunication, or access to Internet services.

Against this background, DE 10 2013 223 972 A1 describes a driver information system for a motor vehicle. The driver information system comprises a central control unit which contains a central search component. One or more instances of the central search component can be called up at any time by a user of the driver information system via a human-machine interface. An application of the driver information system presently running in the foreground defines a context for a search in this case, which context is utilized by the instance of the search component for a context-specific search request. Due to the fact that the application running in the foreground provides the context, context-specific search results may be ascertained and displayed, whereby the relevance of the results for the user is increased and the number of results that the user must view is reduced.

One problem addressed by the disclosed embodiments is that of providing a user interface for accessing a number of functions, in which a simpler operation is attained without reducing the functional scope.

This problem is solved by a disclosed user interface, by a disclosed method, and by a disclosed computer-readable storage medium including instructions.

According to a first disclosed embodiment, in a user interface for accessing a number of functions, assigned to a first subset of the functions are menu commands of the user interface, by way of which the functions can be called up. No menu commands of the user interface are assigned to a second subset of the functions. Instead, the functions can be called up by way of a search function of the user interface.

According to a further disclosed embodiment, a method for providing a user interface for accessing a number of functions includes the operations of:

assigning menu commands of the user interface to a first subset of the functions, wherein the functions can be called up by way of the assigned menu commands;

displaying at least one portion of the menu commands on a display device;

making a second subset of the functions accessible for a search function of the user interface, to which second subset no menu commands of the user interface are assigned; and displaying an accessibility to the search function on the display device.

According to yet another disclosed embodiment, a computer-readable storage medium contains instructions which, when run by a computer, prompt the computer to carry out the following operations for providing a user interface for accessing a number of functions:

assigning menu commands of the user interface to a first subset of the functions, wherein the functions can be called up by way of the assigned menu commands;

displaying at least one portion of the menu commands on a display device;

making a second subset of the functions accessible for a search function of the user interface, to which second subset no menu commands of the user interface are assigned; and displaying an accessibility to the search function on the display device.

According to the disclosure, a classical HMI concept is modified in such a way that only a portion of the functions can be called up directly by way of menu commands. This portion, which comprises, for example, 10% to 30% of the functional scope, can be classically reached and operated by way of a menu structure (menu; home screen; "favorite" buttons, . . . ). This portion typically contains the most important and most frequently required functions. The rest of the functions can be reached and operated only by a search. The HMI provides an input field, either permanently or at least in certain menus, for the search. In this way, all the functions can still be reached. At the same time, the menu structure is substantially streamlined and is therefore more transparent to the user.

According to at least one disclosed embodiment, a preliminary results list is displayed upon activation of a data entry form of the search function. The preliminary results list comprises, in this case, results of a previous search, context-specific entries, and/or entries related to frequently queried topics. Due to the display of a preliminary results list, in many cases, the user no longer needs to enter a search term into the search field, since the desired function is already listed in the preliminary results list. The operation of the HMI is therefore further simplified.

According to at least one disclosed embodiment, the user interface offers a user the option to make a search result accessible as a favorite. Search results can be assigned, for example, immediately, to a "favorite" button for this purpose. Favorites created in this way can appear, for example, in every screen display that contains the results lists. The user is therefore also able to reach functions in the future that are important to him and that actually can only be accessed by way of the search, without having to search through the favorites. In this way, the user can adapt the HMI to his needs to a certain extent.

According to at least one disclosed embodiment, the user interface is configured for assigning a menu command to a function searched for by way of the search function. Alternatively or in addition to the option to store results as a favorite, the user interface can also independently assign a menu command to a function that has been searched for by way of the search function. When the user calls up the searched function more often, for example, he can obtain direct access in a certain menu or a certain screen display. This can be based on the absolute number of invocations or the number of invocations within a certain interval. In this way as well, functions that are important to the user and that are actually accessible only by way of the search can also be called up in the future without searching, by way of menu commands. The user interface therefore automatically adapts itself, to a certain extent, to the habits of the user.

According to at least one disclosed embodiment, the user interface is configured for dispensing with the assignment of a menu command when the associated function has not been utilized during a certain time period. In this way, menu commands for unused functions can be removed from the menus, thereby further improving the transparency of the menus. The unused functions can be functions that could be called up from the beginning by way of menu commands, and functions for which menu commands were subsequently created.

According to at least one disclosed embodiment, the user interface is configured for suggesting further callable functions in response to a search. When the user searches certain functions, callable functions can be suggested, for example, within the scope of this function. If requested, further information regarding the functions can then be delivered or such suggestions can be prevented in the future. By way of the suggestion of further callable functions, the user is instructed about functions that are unknown to him, under certain circumstances, and that he may be interested in using. In this way, the user happens to get to know the possibilities offered by the user interface and the available functional scope.

According to at least one disclosed embodiment, the user interface is configured for providing a help concept for a user in the event that a search is not successful. For example, in the case that a search is not successful, the search can be expanded to an on-line search. As a further possibility, a concierge call button can be displayed, which effectuates a call connection to a service center. Alternatively, a transmission of the user interaction to a service center can be initiated by way of a button. In this way, it can be ensured that, in the event of an unsuccessful search or a search that does not yield the function desired by the user, the user can also receive further assistance in the search for the desired function, for example, by a service center staff member.

According to at least one disclosed embodiment, the user interface is configured for recognizing a language of a term that was entered into a data entry field of the search function, and for outputting a result in the recognized language. In this way, the user can enter, for example, in the data entry field of the search function, the word "Hilfe", "help", "aide", etc., at any time and in any language that is available for the user interface, to obtain help that is appropriate for the situation. This help then automatically takes place in the particular language. A user can therefore interact with the user interface even when the user interface has been set up in a language that the user does not know. For example, the user can change the language setting of the user interface to his native language in a rental vehicle in a foreign country without having to understand the previously displayed menu commands.

Optionally, a disclosed user interface or a disclosed method is utilized in a driver information system for a vehicle and/or in an autonomously or manually controlled vehicle.

Embodiments are described in greater detail in the following with reference to the figures, to improve the understanding of the principles of the disclosure. It is understood that the disclosure is not limited to these embodiments and that the described features can also be combined or modified without departing from the scope of protection of the disclosure as it is defined in the attached claims.

FIG. 1 schematically shows a user interface 1 for accessing a number of functions. In the example shown, the user interface 1 is represented on a display device 2. Menu commands 3 are assigned to a subset of the callable functions. By activating a menu command 3, a user of the user interface 1 can call up the assigned function. No menu commands 3 are assigned to a further subset of the callable functions, however. A search function 4 is available within the user interface 1 for invoking these functions. After the search function 4 has been called up or after a search term has been entered, search results are displayed to the user, from which the user can invoke the desired function. The interaction between the user and the user interface 1 can take place in a variety of ways, for example, as an acoustic input, a mechanical input, or a contactless input. An acoustic input may take place as a spoken command via a microphone. A mechanical input can take place by a keypad, a touchscreen, or operating elements 5 of the user interface 1, although a control element can also be provided that is specially designed for the control, for example, a multifunctional rotary knob. For a contactless input, gestures or eye movements of the user may be detected with the aid of a camera. Combinations of the different input methods are also possible, of course.

Figure 2:
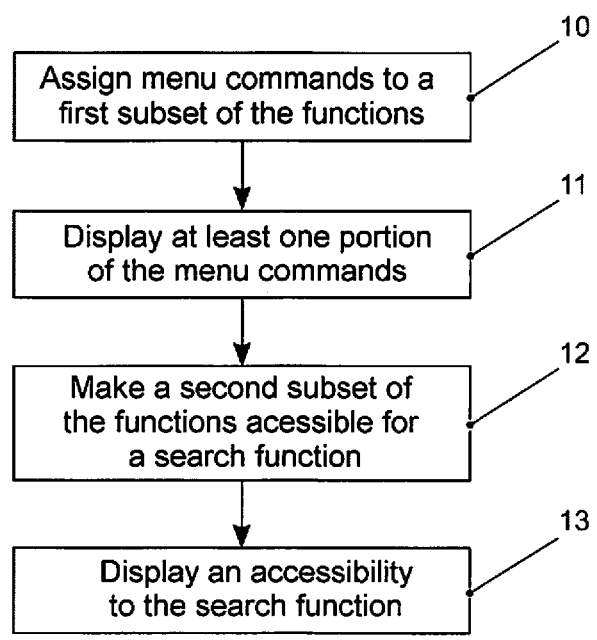
FIG. 2 schematically shows a method for providing a user interface for accessing a number of functions.

FIG. 2 schematically shows a method for providing a user interface for accessing a number of functions. In a first operation, menu commands of the user interface are assigned 10 to a first subset of the functions, via which commands the functions can be called up. At least a portion of the menu commands is displayed 11 on the display device of the user interface. A second subset of the functions, to which no menu commands of the user interface are assigned, is made accessible 12 for a search function of the user interface. Therefore, an access to the search function is displayed 13 on the display device of the user interface.

Figure 3:
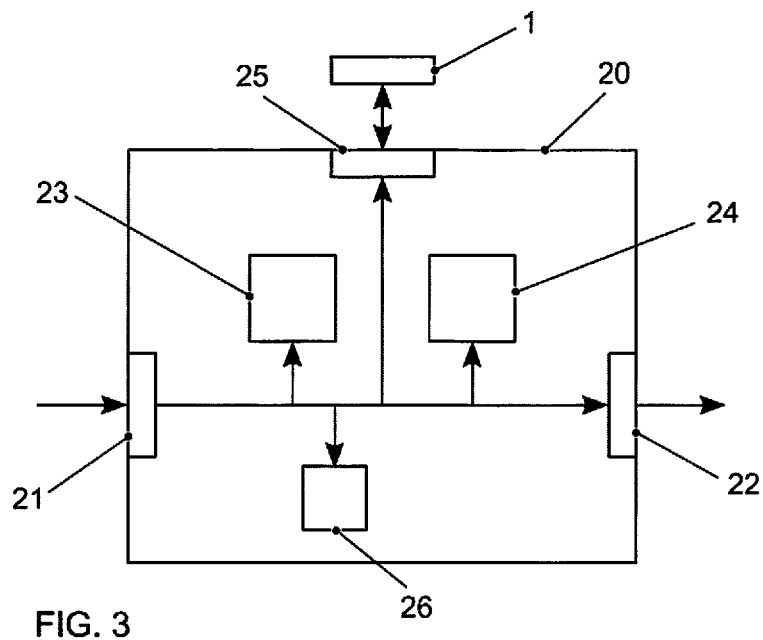
FIG. 3 shows a first embodiment of a driver information system for a vehicle.

FIG. 3 shows a simplified schematic representation of a first disclosed embodiment of a driver information system 20 for a vehicle. The driver information system 20 comprises an input 21 for receiving data from an on-board electrical system of the vehicle and comprises an output 22 for outputting data to the on-board electrical system. In addition, the driver information system 20 comprises an interface 25 for communicating with a user interface 1. The user interface 1 can also be an integral component of the driver information system 20, however. The input 21, the output 22, and the interface 25 can be implemented as separate interfaces or entirely or partially as a combined bidirectional interface. A processing unit 23 processes the data received via the on-board electrical system and generates the required instructions for a graphics processor 24 to represent menu commands and a search function on a display device of the user interface 1. In addition, the processing unit 23 processes the data received from the user interface 1 and forwards, via the on-board electrical system, if necessary, the required instructions to the particular components or control units of the vehicle. The data accumulating in the driver information system 20 can also be stored in a memory 26 of the system 20, for example, for a subsequent evaluation. The processing unit 23 and the graphics processor 24 can be implemented as dedicated hardware, for example, as integrated circuits. They can also be implemented, of course, partially or completely combined or as software that runs on a suitable processor.

Figure 4:
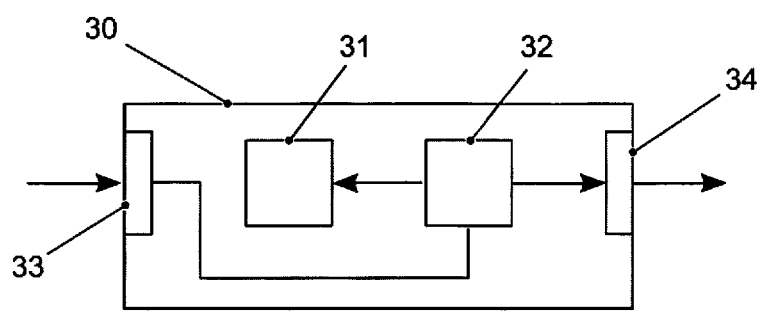
FIG. 4 shows a second embodiment of a driver information system for a vehicle.

FIG. 4 shows a simplified schematic representation of a second disclosed embodiment of a driver information system 30 for a vehicle. The driver information system 30 comprises a processor 32 and a memory 31. The driver assistance system 30 is a computer, for example. Instructions are stored in the memory 31, which, when carried out by the processor 32, prompt the driver information system 30 to provide one of the described user interfaces or to carry out the operations according to one of the described methods. The instructions stored in the memory 31 therefore embody a program which can be carried out by the processor 32 and which implements the disclosed method or the disclosed user interface. The driver information system 30 comprises an input 33 for receiving data. Data generated by the processor 32 are provided via an output 34, for example, to be displayed on a display device. They can also be stored in the memory 31. The input 33 and the output 34 can be combined to form one bidirectional interface.

The processor 32 can comprise one or more processor units, for example, microprocessors, digital signal processors, or combinations thereof.

The memories 26, 31 of the described embodiments can comprise volatile and/or non-volatile memory areas and can include highly diverse storage units and storage media, for example, hard drives, optical storage media, or semiconductor storage.

Figure 5:
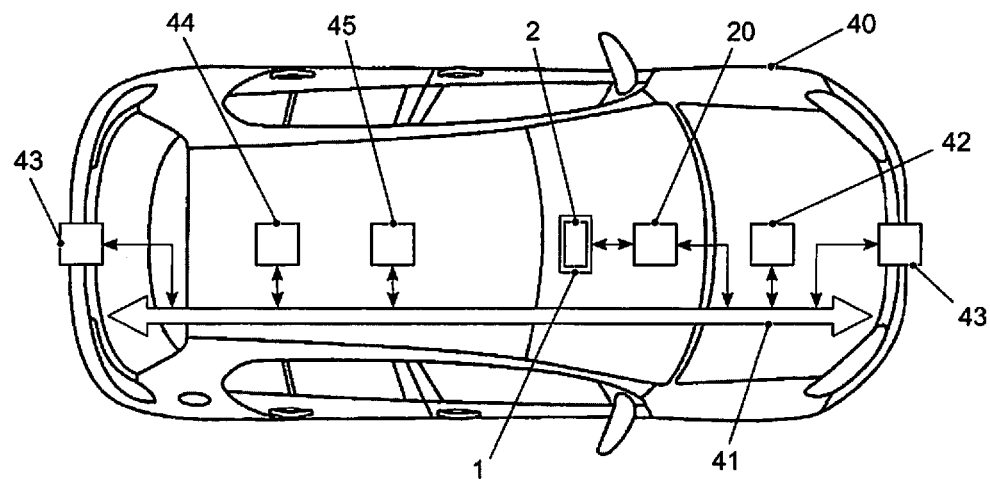
FIG. 5 shows a vehicle comprising a driver information system.

FIG. 5 schematically shows a vehicle 40 comprising a driver information system 20. The driver information system 20 is connected to a user interface 1 comprising a display device 2. The user interface 1 can also be an integral component of the driver information system 20 in this case. The driver information system 20 is incorporated into an on-board electrical system 41 of the vehicle 40. By way of the on-board electrical system 41, it is possible to access a number of vehicle components, for example, control units 42, sensors 43, communication interfaces 44, or data memories 45.

Data from the control units 42 and sensors 43 can be displayed or evaluated by the driver information system 20 as necessary; at least some of the settings of the control devices 42 can also be changed by way of the driver information system 20, for example, for adjusting a vehicle air conditioning or the suspension. The communication interfaces 44 can be unidirectional interfaces, for example, for radio reception or for receiving position data for the vehicle navigation. Bidirectional interfaces can also be provided, e.g., for accessing Internet services, for telecommunication, or for data exchange with a mobile device of a vehicle passenger, e.g., a smartphone or a tablet. Examples of data memories 45 are a USB flash drive, a hard drive integrated into the vehicle 40, or a solid state memory. Multimedia contents such as music or video files, as well as map data for navigation, for example, can be stored on the data memories 45.

An embodiment is to be described in detail in the following with reference to FIGS. 6 to 9.

Figure 6:
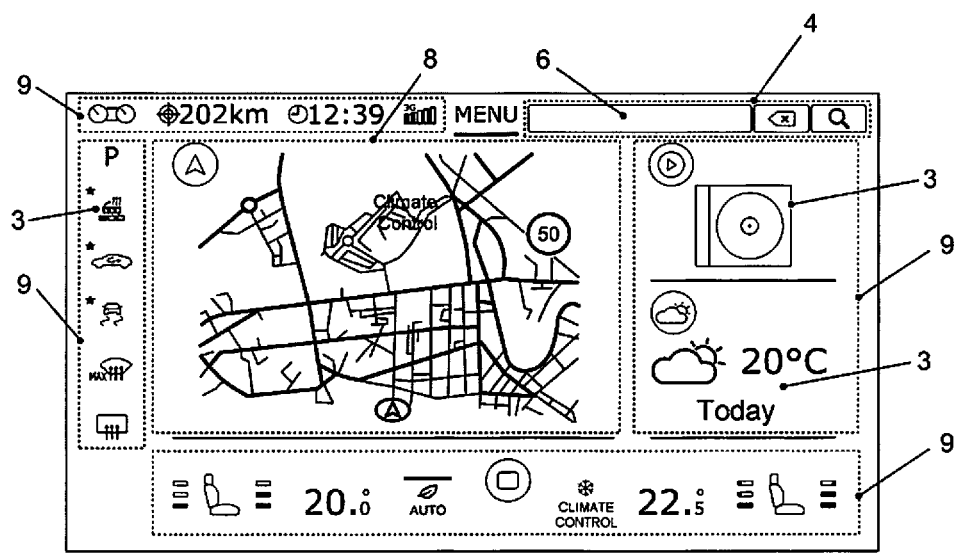
FIG. 6 shows a first embodiment of a user interface including a search function.

FIG. 6 shows a first disclosed embodiment of a user interface 1 including a search function 4. In this disclosed embodiment, a permanent data entry field 6 is provided in the user interface 1, independently of which menu or sub-menu is presently displayed or which function is being carried out. In the example in FIG. 6, a navigation function, inter alia, is carried out. The user interface 1 therefore comprises a navigation area 8, in which the present position of the vehicle, a route, and environment-specific information are displayed, i.e., a speed limit in this case. In addition, there is a row of information areas 9, in which highly diverse pieces of information are communicated, for example, weather data, information regarding music playback, the distance to the destination and time of arrival at the destination, the vehicle air conditioning, and further vehicle settings. Some of the pieces of information simultaneously serve as menu commands 3, which are activated to reach the assigned function. By touching the weather data, one enters the weather menu, for example, including the weather forecast; by touching the pieces of information related to music playback, one enters the multimedia menu, in which, for example, other music titles can be selected, etc. By way of other menu commands 3, the vehicle settings can be directly changed, for example, the steering wheel heater, the front windshield blower, or the rear windshield heater can be switched on or off. The representation of the menu commands can be changed, in this case, depending on the particular vehicle setting, and so it is immediately apparent whether a function is switched on or off, or at which level it presently is, for example, in the case of the seat heater or the front windshield blower.

Figure 7:
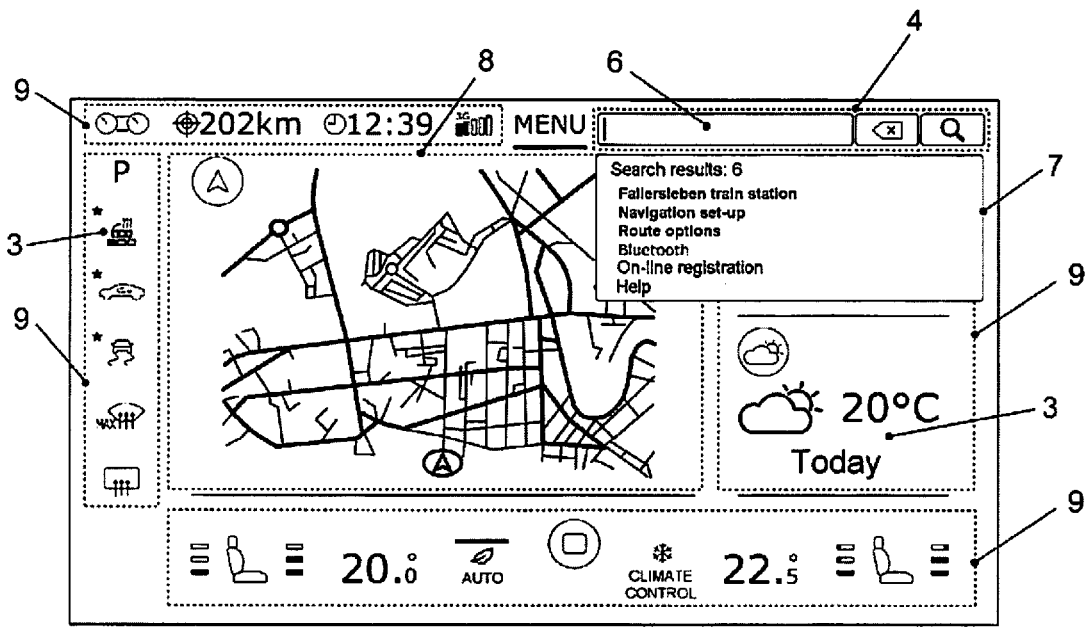
FIG. 7 shows the embodiment of FIG. 6 including a displayed results list.

FIG. 7 shows the embodiment from FIG. 6 including a displayed results list 7. Immediately after activation of the data entry field 6, even before a search term has been entered, a preliminary results list 7 appears. This includes, for example, last results, i.e., results of previous searches, context-specific entries, entries related to frequently queried topics, and/or help assistants. In FIG. 7, the preliminary results list 7 contains examples of all of these possibilities. A previous search result is listed as the first entry, which is a previously searched address in this case. The entries "Navigation Setup" and "Routine Options" are context-specific entries. They appear because a navigation function is presently being carried out. The entries "BLU-ETOOTH®" and "Online Registration" relate to frequently queried topics; they are independent of the present context. Finally, a "Help" entry is also available. The user now has the option to select one of the entries in the preliminary results list 7, provided this entry corresponds to the desired function. Otherwise, a search term can be entered and a corresponding search can be carried out. The result of the search can include, in this case, functions that can be called up only by way of a search, as well as functions to which menu commands are assigned.

Figure 8:
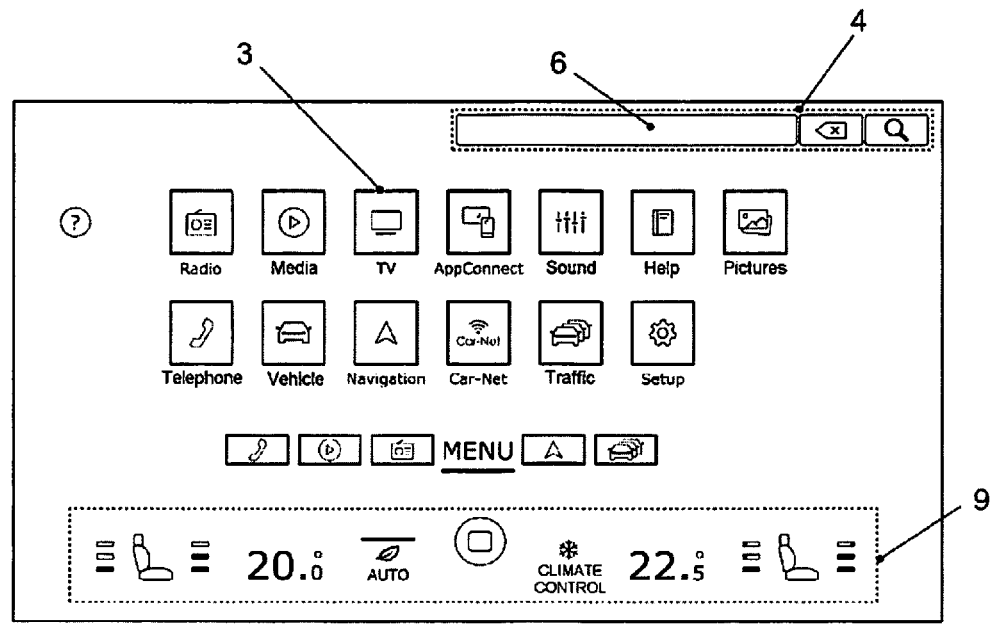
FIG. 8 shows a second embodiment of a user interface including a search function.

FIG. 8 shows a second disclosed embodiment of a user interface 1 including a search function 4. The search function 4 is not permanently available in this disclosed embodiment, but rather is available in only one or a few menus or submenus. In the example in FIG. 8, an overview menu is displayed, which enables access to menus related to the highly diverse topics by way of corresponding menu commands 3. In addition to the menu commands and the search function 4 next to the data entry field 6, an information area 9 is also present in this example.

Figure 9:
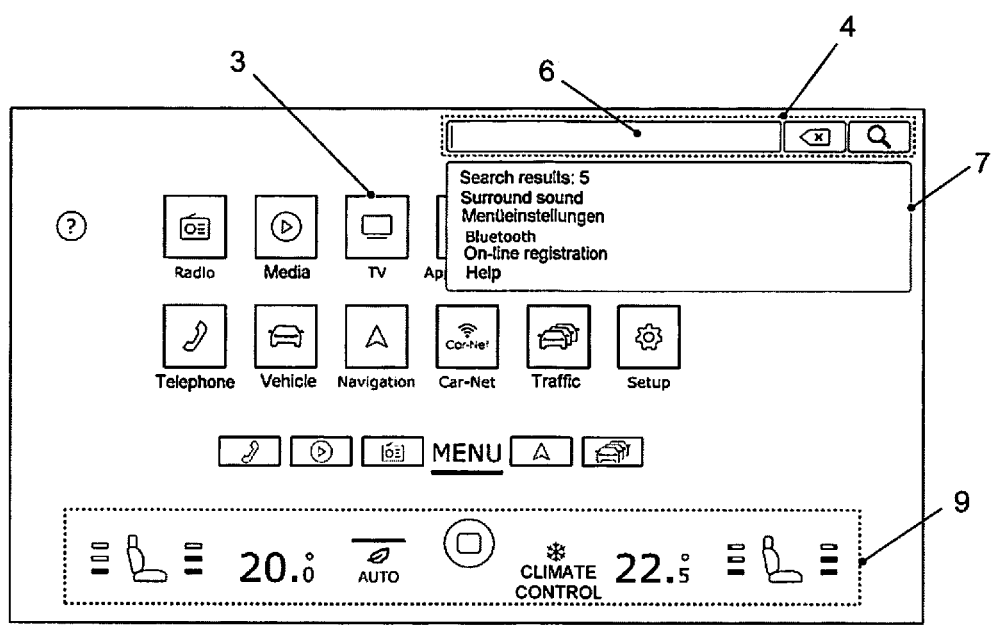
FIG. 9 shows the embodiment of FIG. 8 including a displayed results list.

FIG. 9 shows the embodiment from FIG. 8 including a displayed results list 7. Immediately after activation of the data entry field 6, even before a search term has been entered, a preliminary results list 7 appears in this case as well. This includes, in turn, last results, context-specific entries, entries related to frequently queried topics, and/or help assistants. In FIG. 9, the preliminary results list also 7 contains examples of all of these possibilities. A previous search result is listed as the first entry, i.e., "Surround Sound"; a tone control was previously searched in this case. The entry "Menu Settings" is a context-specific entry, since it enables the presently displayed menu to be adjusted. The entries "BLUETOOTH®" and "Online Registration" relate to frequently queried topics, as is also the case in the previous example; they are independent of the present context. Finally, a "Help" entry is also available in this case. The user now has the option to select one of the entries in the preliminary results list 7, provided this entry corresponds to the desired function. Otherwise, a search term can be entered and a corresponding search can be carried out.

Which functions are accessible only by way of a search is established first and foremost by the designer of the user interface 1. One possibility, for example, is that the "Help" menu contains only or primarily one search field. It is also possible that only the electronic manual or the operating instructions, on-line functions that may be accessible, or all set-up functions can be reached only by way of a search. In various devices, there is an independent, higher-order "Setup" menu as well as one further "Setup" menu depending on the context. The "Setup" menu for the context "Telephone" then only contains optional settings for the telephone usage; the "Setup" menu for the context "Navigation" only contains optional settings for the navigation function, etc. Depending on the implementation, the search only replaces the higher-order "Setup" menu, only the "Setup" menus for the contexts, or all "Setup" menus. The "Setup" menus can also be retained in a reduced, simplified form. In this case, the search function only replaces the remaining, eliminated functions. The option is provided in this case that the user can make a search result accessible as a favorite. Search results, in particular successful search results, can be stored immediately as a favorite for this purpose, or can be assigned to a "favorite" button. Favorites created in this way can appear, for example, in every screen display that contains the results lists.

Alternatively or in addition to the possibility to store results as a favorite, the user interface 1 can also independently assign a menu command to a function that has been searched for by way of the search function 4. When the user calls up the searched function more often, for example, he can obtain direct access in a certain menu or a certain screen display, for example, in a "Favorites" menu. This can be based on the absolute number of invocations or the number of invocations within a certain interval. Optionally, this direct access and further menu entries can disappear after a certain period of time of non-use. In addition, when the user searches certain functions, callable functions can be suggested within this scope. For example, when a user searches a function "xy", the user can be informed that he can also invoke the functions "u, v and w" by way of the search. If requested, further information regarding the functions can then be delivered or such suggestions can be prevented in the future.

In at least one disclosed embodiment, the language of a term that was entered into the data entry field 6 of the search function 4 is recognized. The result is then output in the recognized language. In this way, the word "Hilfe", "help", "aide", etc., can be entered, for example, in any speller that is present in the user interface 1 for the alphanumeric input, at any time and in any language that is available for the user interface 1, to obtain help that is appropriate for the situation. This help then automatically takes place in the particular language.

In at least one disclosed embodiment, a help concept is provided for the user, which takes effect in the event of an unsuccessful search. As a first possibility, in the case that a search is not successful, the search can be expanded to an on-line search. As a further possibility, in addition to the data entry field 6, a concierge call button can be displayed, which effectuates a call connection to a service center. Alternatively, a transmission of the user interaction to a service center can be initiated by way of a button.

LIST OF REFERENCE NUMBERS 1 user interface
2 display device
3 menu commands
4 search function
5 operating element
6 data entry field
7 results list
8 navigation area
9 information area
10 assign menu commands to a first subset of the functions
11 display at least one portion of the menu commands 12 make a second subset of the functions accessible for a search function
13 display an accessibility of the search function
20 driver information system
21 input
22 output
23 processing unit
24 graphics processor
25 interface
26 memory
30 driver information system
31 memory
32 processor
33 input
34 output
40 vehicle
41 on-board electrical system
42 control unit
43 sensor
44 communication interface
45 data memory

The invention claimed is:

1. A transportation vehicle interface system including a user interface presented via a display of a transportation vehicle for accessing a plurality of functions locally stored by the transportation vehicle interface, the transportation vehicle interface comprising:
a plurality of user interface menu commands assigned to a first local subset of the plurality of locally stored functions, wherein, the first local subset of the plurality of locally stored functions are configured to be directly called up by user activation of the corresponding user interface menu command, wherein the menu commands are each individually presented on the display of the transportation vehicle; and
a search function command configured for user operation to retrieve activatable commands including commands corresponding to a second local subset of the locally stored functions, distinct from the first local subset, to which no user interface command is assigned,
wherein the commands corresponding to the second local subset of the locally stored functions are called up and accessible on the user interface, only indirectly, via the search function command of the user interface, and wherein the second local subset of the locally stored functions includes only functions eliminated for access without the search function command.

2. The user interface of claim 1, wherein the user interface displays a preliminary results list in response to activation of a data entry form of the user interface search function.

3. The user interface of claim 2, wherein the preliminary results list includes results of a previous search, context-specific entries, entries related to frequently queried topics, and/or a help assistant.

4. The user interface of claim 1, wherein the user interface displays an option to make a search result accessible as a favorite.

5. The user interface of claim 1, wherein the user interface includes a menu command assigned to a function searched for the user interface search function.

6. The user interface of claim 1, wherein the user interface dispenses with the assignment of a menu command when the associated function has not been utilized during a certain time period.

7. The user interface of claim 1, wherein the user interface displays a suggestion of further callable functions in response to performance of a search using the user interface search function.

8. The user interface of claim 1, wherein the user interface displays a help concept for a user in the event that a search is not successful at identifying any results.

9. The user interface of claim 1, wherein the user interface recognizes a language of a term that was entered into a data entry field of the user interface search function, and outputs a result of a search performed using the user interface search function in the recognized language.

10. The transportation vehicle interface system of claim 1, wherein the plurality of locally stored functions comprises locally stored program operations executing locally stored instructions.

11. A method for providing a transportation vehicle user interface for accessing a plurality of locally stored functions of a transportation vehicle, the method comprising:
assigning menu commands of the user interface to a first local subset of the plurality of locally stored functions, wherein the locally stored functions are directly called up by user activation of the assigned menu commands;
displaying at least one portion of the menu commands on a display device of the transportation vehicle;
making a second local subset of the plurality of locally stored functions, distinct from the first local subset, accessible on the user interface, only indirectly, by user operation of a search function of the user interface, to which second local subset no menu commands of the user interface are assigned such that the second local subset of the locally stored functions includes only functions eliminated for access without the search function; and
displaying an accessibility to the search function on the display device.

12. A non-transitory computer-readable memory medium including instructions which, when run by a computer, prompt the computer to carry out the following operations for providing a transportation vehicle user interface for accessing a plurality of locally stored functions:
assigning menu commands of the user interface to a first local subset of the plurality of locally stored functions, wherein the locally stored functions are called up directly by user activation of the assigned menu commands;
displaying at least one portion of the menu commands on a display device;
making a second local subset of the plurality of locally stored functions, distinct from the first local subset, accessible only indirectly by user operation of a search function of the user interface, to which second local subset no menu commands of the user interface are assigned such that the second local subset of the locally stored functions includes only functions eliminated for access without the search function; and
displaying an accessibility to the search function on the display device.

13. A driver information system for a vehicle, the driver information system including a user interface for accessing a plurality of locally stored functions, the user interface including:
a transportation vehicle display presenting a plurality of user interface menu commands assigned to a first local subset of the plurality of locally stored functions, wherein, the first local subset of the plurality of locally stored functions are configured to be directly called up by user activation of the corresponding user interface menu command; and a user interface search function command configured for user operation to retrieve activatable commands including commands corresponding to a second local subset of the plurality of locally stored functions, distinct from the first local subset, to which no menu command is assigned, wherein the second local subset of the plurality of locally stored functions are called up and accessible on the user interface, only indirectly, via the search function command of the user interface, wherein the second local subset of the locally stored functions includes only functions eliminated for access without the search function command.

14. The driver information system of claim 13, wherein the user interface displays a preliminary results list in response to activation of a data entry form of the user interface search function.

15. The driver information system of claim 13, wherein the preliminary results list includes results of a previous search, context-specific entries, entries related to frequently queried topics, and/or a help assistant.

16. The driver information system of claim 13, wherein the user interface displays an option to make a search result accessible as a favorite.

17. The driver information system of claim 13, wherein the user interface includes a menu command assigned to a function searched for the user interface search function.

18. The driver information system of claim 13, wherein the user interface dispenses with the assignment of a menu command when the associated function has not been utilized during a certain time period.

19. The driver information system of claim 13, wherein the user interface displays a suggestion of further callable functions in response to performance of a search using the user interface search function.

20. The driver information system of claim 13, wherein the user interface displays a help concept for a user in the event that a search is not successful at identifying any results.

21. The driver information system of claim 13, wherein the user interface recognizes a language of a term that was entered into a data entry field of the user interface search function, and outputs a result of a search performed using the user interface search function in the recognized language.

22. An autonomously or manually controlled transportation vehicle, wherein the transportation vehicle comprises a driver information system for the transportation vehicle, the driver information system including a user interface for accessing a plurality of locally stored functions, the user interface including:

a plurality of user interface menu commands assigned to a first local subset of the plurality of locally stored functions, wherein, the first local subset of plurality of locally stored functions configured to be called up directly by user activation of the corresponding user interface menu command; and a user interface search function command configured for user operation to retrieve activatable commands including commands corresponding to a second local subset of the plurality of locally stored functions, distinct from the first local subset, to which no menu command is assigned, wherein a second local subset of the plurality of locally stored functions are called up and accessible on the user interface, only indirectly, via the search function command of the user interface, wherein the second local subset of the locally stored functions includes only functions eliminated for access without the search function command.

* * * * *